United States Patent [19]

Vander Ark, Jr. et al.

[11] Patent Number: 5,569,383
[45] Date of Patent: Oct. 29, 1996

[54] FILTER WITH AXIALLY AND ROTATABLY MOVABLE WIPER

[75] Inventors: John D. Vander Ark, Jr., Kalamazoo; Danny K. Kaiser, Three Rivers, both of Mich.

[73] Assignee: Delaware Capital Formation, Inc., Wilmington, Del.

[21] Appl. No.: 356,567

[22] Filed: Dec. 15, 1994

[51] Int. Cl.$^6$ .................................................. B01D 29/64
[52] U.S. Cl. ........................ 210/408; 210/413; 210/415; 209/273; 209/306
[58] Field of Search .................................. 210/413, 414, 210/415, 407, 408; 209/273, 306

[56] References Cited

U.S. PATENT DOCUMENTS

| | | |
|---|---|---|
| 1,199,350 | 9/1916 | Collin . |
| 1,689,277 | 10/1928 | Burns . |
| 2,173,060 | 9/1939 | Andrews . |
| 2,606,663 | 8/1952 | Blackman . |
| 2,835,390 | 5/1958 | King . |
| 3,365,065 | 1/1968 | Varjabedian . |
| 3,853,762 | 12/1974 | Moatti . |
| 4,042,504 | 8/1977 | Driori . |
| 4,155,841 | 5/1979 | Chupka et al. . |
| 4,271,019 | 6/1981 | Galletti . |
| 4,519,906 | 5/1985 | Hikosaka et al. . |
| 4,663,030 | 5/1987 | Chupka et al. . |
| 5,087,365 | 2/1992 | Davis et al. . |
| 5,198,111 | 3/1993 | Davis . |
| 5,228,993 | 7/1993 | Dori . |

FOREIGN PATENT DOCUMENTS

| | | |
|---|---|---|
| 058656 | 8/1982 | European Pat. Off. . |
| 207797 | 7/1987 | European Pat. Off. . |
| 2931865 | 4/1980 | Germany . |
| 63-293402 | 11/1988 | Japan . |

*Primary Examiner*—Thomas M. Lithgow
*Attorney, Agent, or Firm*—Flynn, Thiel, Boutell & Tanis, P.C.

[57] ABSTRACT

A self-cleaning pressure filter system comprises a housing having an unfiltered liquid inlet and a filtered liquid outlet, a filter element of substantially constant cross section having an interior communicating with the unfiltered liquid inlet and an exterior communicating with the filtered liquid outlet for filtering solids from the liquid and wherein filtered out solids are left in the interior of the filtered element. A cleaning unit is simultaneously moved both axially and rotatively along the interior of the filter element and carries at least one cleaning blade movable in a spiral path along the interior face of the filter element for removing solids accumulated thereon.

18 Claims, 11 Drawing Sheets

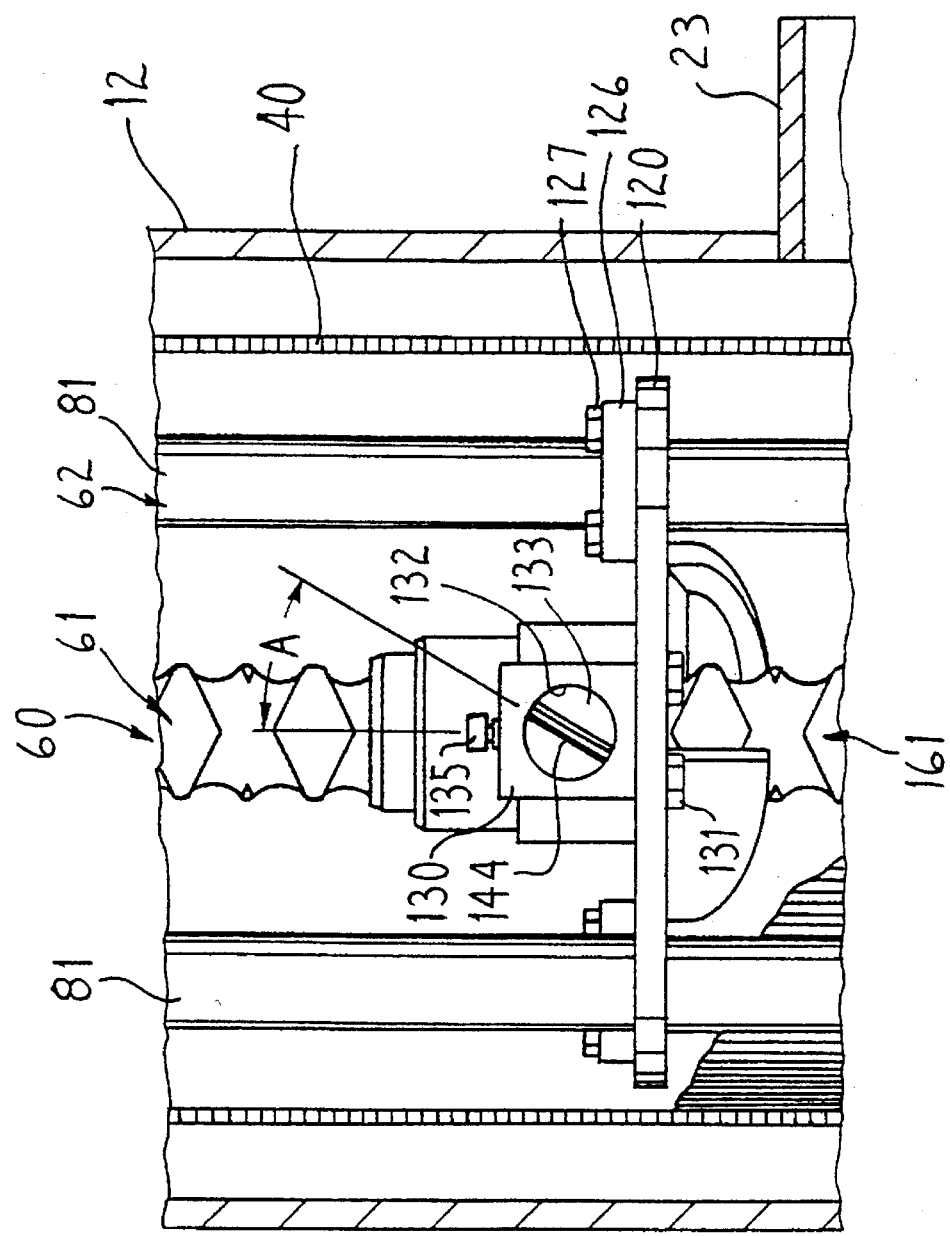

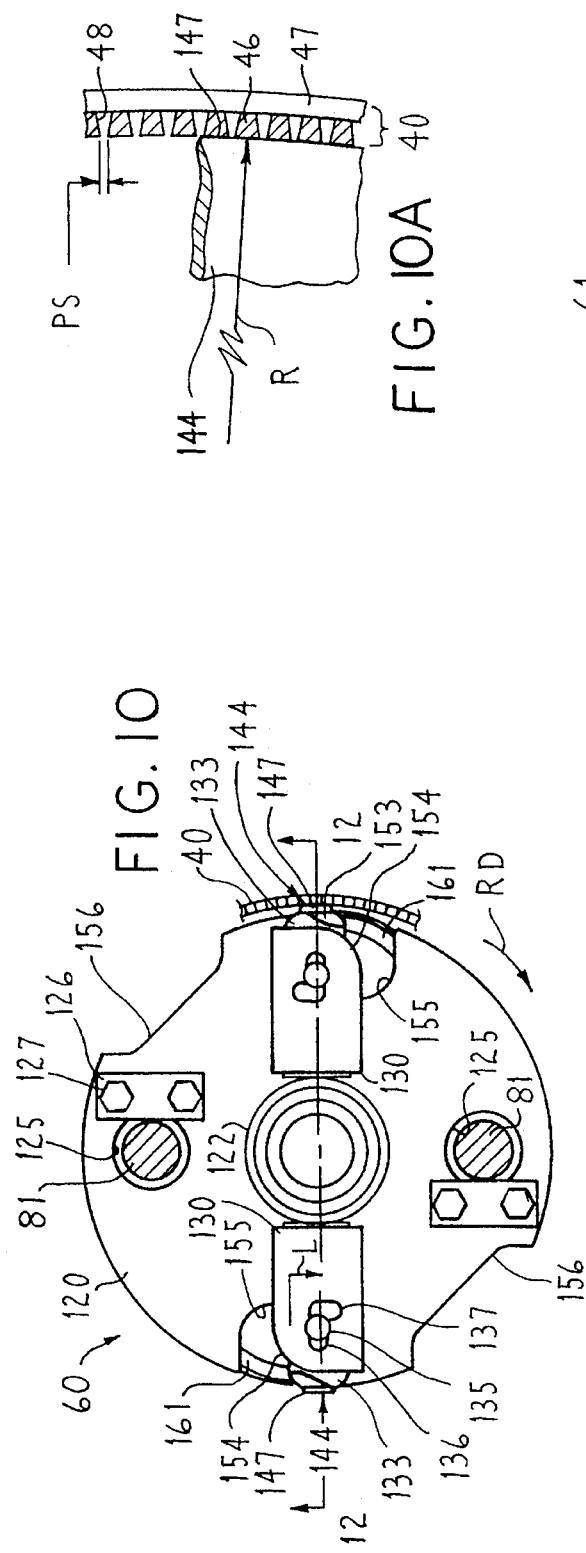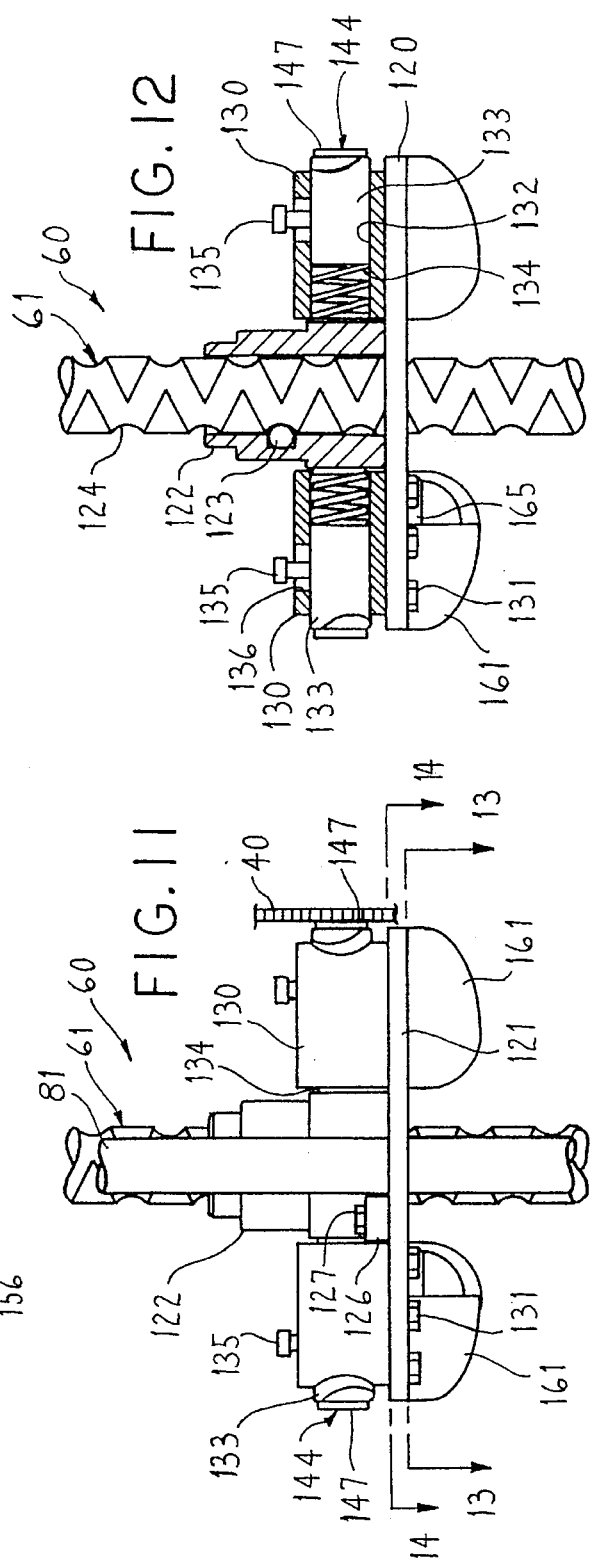

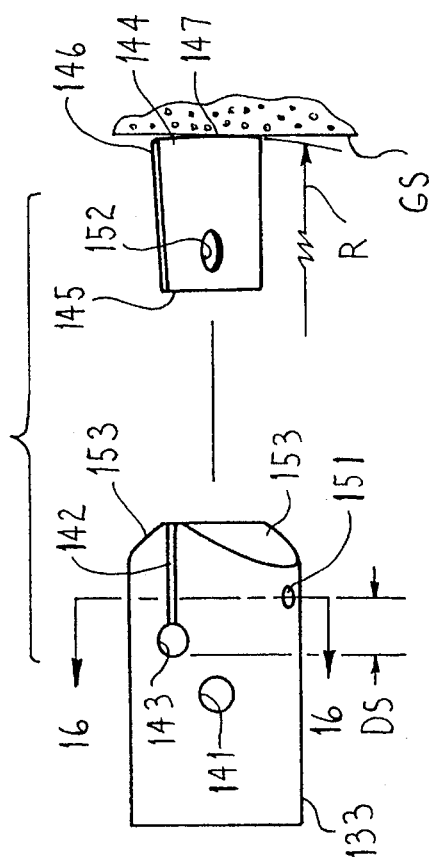
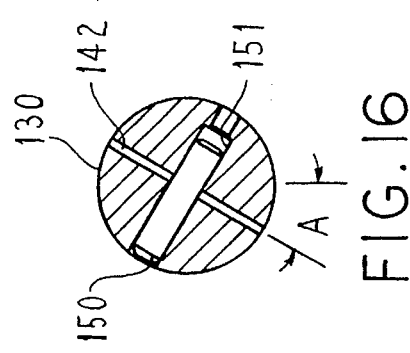
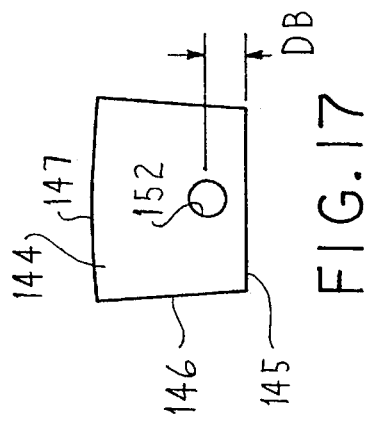

FILTER WITH AXIALLY AND ROTATABLY MOVABLE WIPER

FIELD OF THE INVENTION

This invention relates to an industrial pressure filter system and more particularly to a self-cleaning one having an axially and rotatably cleaning member for cleaning the filter element.

BACKGROUND OF THE INVENTION

U.S. Pat. No. 5,198,111, assigned to the Assignee of the present invention, discloses an industrial pressure filter system having a cylindrical filter element, an unfiltered liquid inlet communicating with the interior of the filter element and a filtered liquid outlet communicating with the outside of the filter element. A screw extends axially within the filter element and is rotatable in opposite directions to axially move a cleaning member in opposite axial directions therealong within the filter element for cleaning the inlet side of the filter element. Holes in the cleaning member allow axially flow of liquid to be filtered therethrough, so that liquid to be filtered can always reach substantially the entire length of the filter element. Threadless portions at the end of the screw allow the cleaning member to idle thereon while awaiting a reversal of screw rotation direction. Springs cooperate with the threadless portions to axially urge the cleaning member onto the threaded portion of the screw upon reversal of screw rotation direction to carry the cleaning member back in the opposite direction along the length of the screw. The cleaning member includes a radially thin, radially bendable circular wiper element backed radially by a backing O-ring resiliently compressed diametrally in its cross section for urging the circular wiper element resiliently out against the interior wall of the filter element.

While this prior system has worked well and been commercially successful, a continuing effort to improve thereon has resulted in the present invention.

The objects and purposes of the present invention include providing an improved self-cleaning filter system of the type above generally described. Further objects and purposes of the invention will be apparent to persons acquainted with apparatus of this general kind upon reading the following description and inspecting the accompanying drawings.

SUMMARY OF THE INVENTION

A self-cleaning pressure filter system comprises a housing having an unfiltered liquid inlet and a filtered liquid outlet, a filter element of substantially constant cross section having an interior communicating with the unfiltered liquid inlet and an exterior communicating with the filtered liquid outlet for filtering solids from the liquid and wherein filtered out solids are left in the interior of the filter element. A cleaning unit is simultaneously moved both axially and rotatively along the interior of the filter element and carries at least one cleaning blade movable in a conical helix path along the interior face of the filter element for removing solids accumulated thereon.

BRIEF DESCRIPTION OF THE DRAWINGS

FIG. 9 is an enlarged fragment of FIG. 1 showing the cleaning unit rotated 90° from its position of FIG. 1.

FIG. 10 is a top view of the FIG. 9 cleaning unit.

FIG. 10A is an enlarged fragment of FIG. 10 showing engagement of a cleaning blade with a typical filter element wall.

FIG. 11 is a right side view of the FIG. 9 cleaning unit.

FIG. 12 is a sectional view substantially taken on the line 12—12 of FIG. 10.

FIG. 15 is an exploded elevational view of a blade and blade carrier embodying the invention.

FIG. 16 is a sectional view substantially taken on the line 16—16 of FIG. 15.

FIG. 17 is a plan view of the blade of FIG. 15.

DETAILED DESCRIPTION

Figure 1:
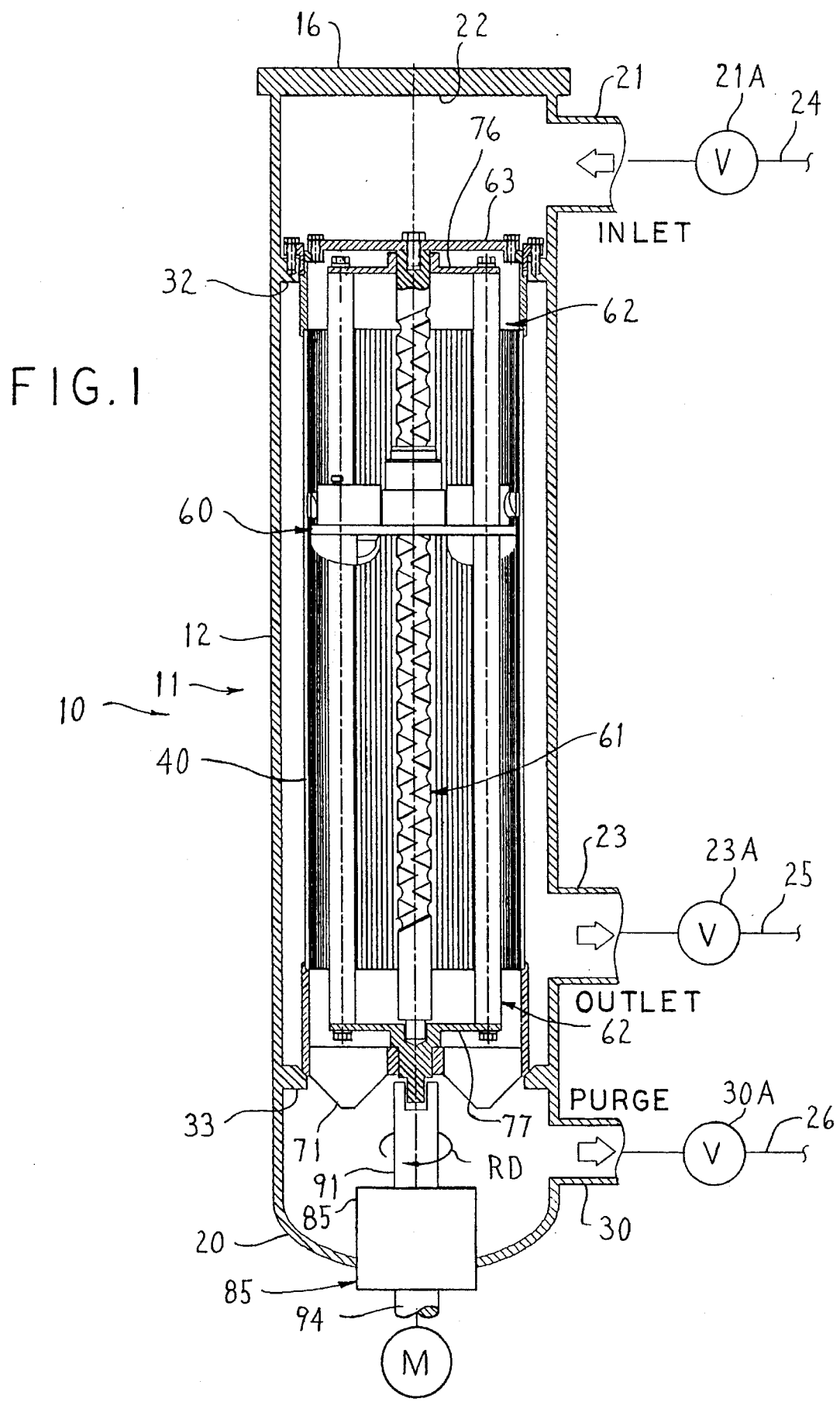
FIG. 1 is a central cross-sectional view, partly in diagrammatic form, of a self-cleaning filter system embodying the invention.

A filter unit 10 embodying the invention comprises a housing 11 shown in simplified form in FIG. 1. The housing 11 may be oriented as desired, for example horizontally or vertically or inclined. However, for convenience in disclosure, the housing 11 is shown vertically oriented in the drawings and is hereafter described in that orientation, the housing 11 comprises a constant circular cross section, tubular casing 12 topped by a cover 16 and shown upstanding. The bottom of the casing 12 is closed by a bottom end cap 20 fixed, preferably by welding, to the bottom of casing 12, as seen for example, at 19 in FIG. 3.

A process liquid (liquid to be filtered) inlet conduit 21 (FIG. 1) opens through the side wall of the inlet portion of the casing 12, into a process liquid chamber 22 topped by the cover 16. A filtered liquid outlet conduit 23 opens through the sidewall of the intermediate portion of the casing 12. A solids outlet conduit 30, for solids separated from the process liquid, opens through the sidewall of the casing 12, in spaced relation below the filtered liquid outlet conduit 23 and adjacent the end cap 20.

The conduits 21, 23 and 30 may be connected in any desired manner to conventional process liquid, filtered liquid and solids drain pipes schematically shown at 24, 25 and 26 respectively in FIG. 1. For example, process liquid to be filtered is conventionally fed from the pipe 24 through a normally open valve 21A in the process liquid inlet conduit 21. Filtered liquid is conventionally removed through a normally open valve 23A in the conduit 23 to the filtered liquid pipe 25. The solids outlet conduit 30 is normally closed by a valve 30A during filtering but is openable to drain collected solids from the filter unit therethrough to a drain pipe 26. The valves 21A, 23A and 30A may be of any conventional type.

The above discussed structure may be supported on a suitable frame (not shown).

Figure 2:
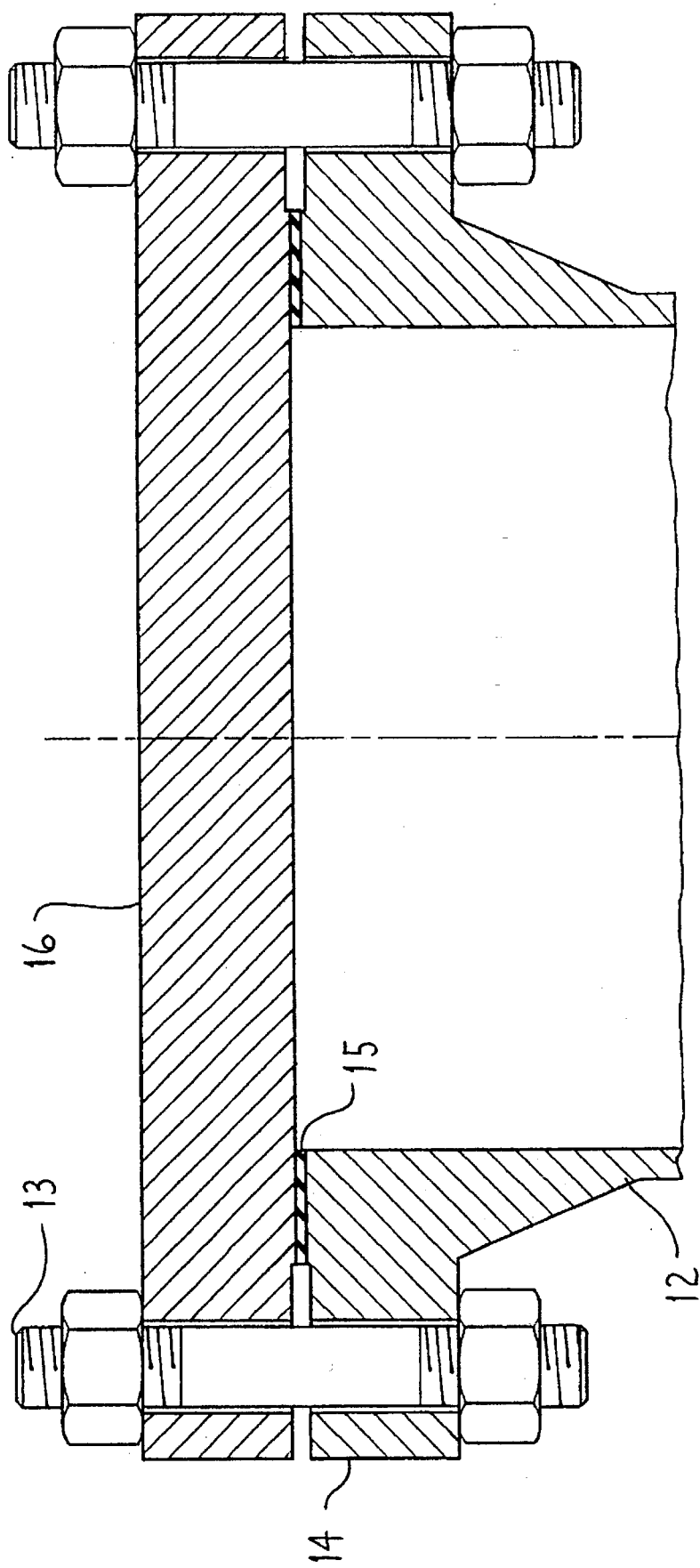
FIG. 2 is an enlarged fragment of FIG. 1 showing the top portion thereof.
Figure 2A:
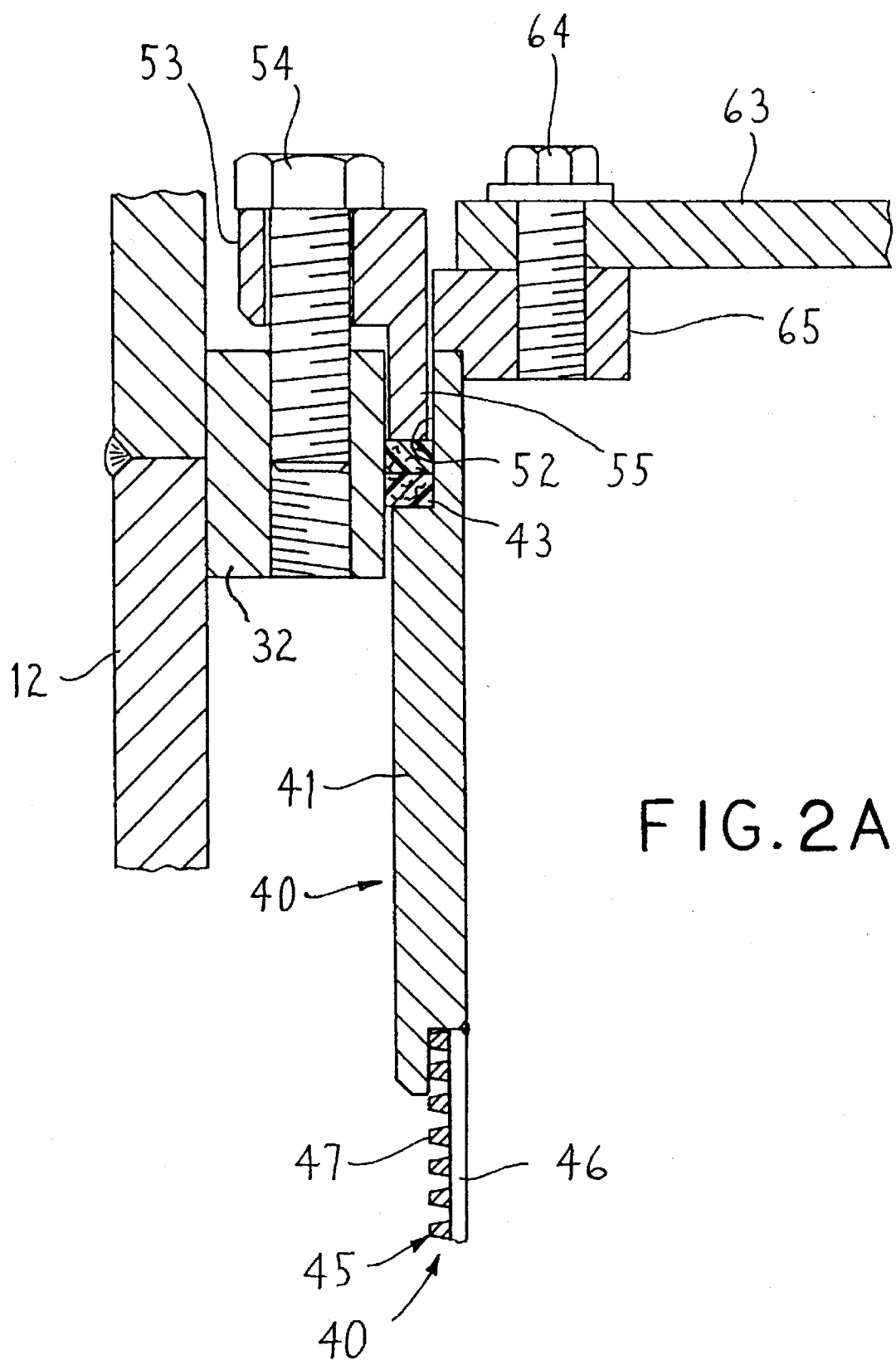
FIG. 2A is an enlarged fragment of FIG. 1 showing the upper filter element mounting structure.

Upper and lower rigid rings 32 and 33 (FIGS. 2A and 4 respectively) are rigidly fixed, as by welding, to the inner surface of the casing 12 between the conduits 21 and 30, and flanking loosely the conduit 23.

A hollow, circularly cylindrical, filter element 40 (FIGS. 1 and 2A) comprises an annular top collar 41. The top collar 41 is snugly but slidably received within the upper ring 32 and is liquid sealed with respect thereto by means of a conventional annular seal 43. The bottom of the filter element 40 is defined by a bottom collar 44 (FIG. 4) which is slidably but snugly received within the ring 33 and is liquid sealed with respect thereto.

The filter element 40 includes a porous filter sleeve 45 (FIG. 2A) which may be of any desired rigid conventional construction. In the embodiment shown, the filter sleeve 45 comprises circumferentially close spaced, vertical ribs 46 (FIGS. 2A and 10A) fixed at their ends, as by welding, to the top and bottom collars 41 and 44 and surrounded by annular ribs 47 which are vertically close spaced and are fixed, as by welding, to the outer faces of the vertical ribs 46 to form therewith a filter mesh. The filter pore size is here set by the vertical rib spacing, for example 0.001 inch. It is contemplated that other types of rigid porous filter sleeves may be employed. For example, the filter sleeve 45 may comprise circumferentially close spaced outer vertical ribs bounding annular inner ribs. As further examples, the filter sleeve may comprise a perforated rigid sheet or a porous ceramic member.

To the extent above described, the apparatus is substantially conventional. Attention is now directed to portions of the apparatus more specifically embodying the invention.

In the embodiment shown, the top cover 16 is conveniently fixed to the top of the casing 12 by vertical, circumferentially spaced, nutted studs 13 extending down through a radially outward extending annular flange 14 fixed at the top of the casing 12, with a suitable annular seal 15 interposed between the cover 16 and flange 14 to prevent outward leakage of liquid therepast.

In the embodiment shown, the annular bottom collar 44 of the filter element 40 rests atop the lower ring 33 and the collar 44 and ring 33 have complimentary, facing tapers indicated at 50 and extending downward and inward, for defining a liquid seal between the interior and exterior of the filter element, while supporting the weight of the filter element 40 on the ring 33. The liquid seal at 50 is enhanced by the weight of the filter element 40.

In the embodiment shown, the annular seal 43 (FIG. 2A), between the top collar 41 of the filter element 40 and the upper ring 32 of the casing, comprises a resilient packing disposed in an outward and upward facing annular recess 52 at the upper edge of the top collar 41. A clamp ring 53 of generally L-shaped cross section has circumferentially spaced screws 54 extending down through its radially outer portion and threadedly received in the upper ring 32 of the casing 12. The clamp ring 53 has, at its radially inner edge, an integral downward extending annular flange 55 which enters the recess 52 and bears down on the packing 43 to effect a liquid tight seal between the interior and exterior of the filter element 40 at its upper end.

Since the upper end of the filter element directly bears only against resilient packing 43, the filter element is able to increase in length without buckling when operating at high temperatures (e.g., 650° F.), the resilient packing giving way and accommodating the extra length. If, instead, the element was rigidly attached to the upper casing ring 32, buckling (and therefore, failure) of the element, could occur at higher temperatures, particularly if the filter element 40 and housing 11 are of materials having respectively higher and lower coefficient of thermal expansion. In one unit constructed in accord with the invention, the element was constructed of stainless steel and the casing was constructed of carbon steel. Stainless steel has a higher coefficient of thermal expansion than carbon steel, and therefore a given length of stainless steel will expand to a greater length than the same length of carbon steel at higher temperatures.

A cleaning unit 60 (FIGS. 1 and 9) is coaxially disposed within the filter element 40 and includes a cross threaded screw 61 and a rotor 62 (FIG. 1). A beam 63 (FIG. 5) extends diametrally across the casing 12 just below the inlet conduit 21. Screws 64 fix the ends of the beam 63 atop diametrically spaced ears 65 welded atop the top collar 41 of the filter element 40 and extending slightly radially inboard therefrom. The beam 63 is relatively narrow and does not impede liquid flow downward therepast. The cross threaded drive screw 61 depends from the central portion of the beam 63 coaxially within the filter element 40. The top of the drive screw 61 is fixed to the beam 63 by a screw 66. An axial pin 67 extends down through the beam 63 into the top of the drive screw 61 and is located beside the screw 66 and hence, eccentrically of the drive screw 61, for positively preventing rotation of the drive screw 61. A washer 68 under the head of the screw 66 overlies the top of the pin 67 and positively prevents upward escape thereof from the drive screw 61.

Figure 8:
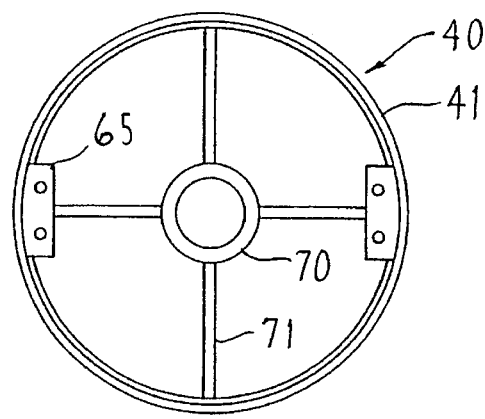
FIG. 8 is a top view of the FIG. 6 filter element.
Figure 6:
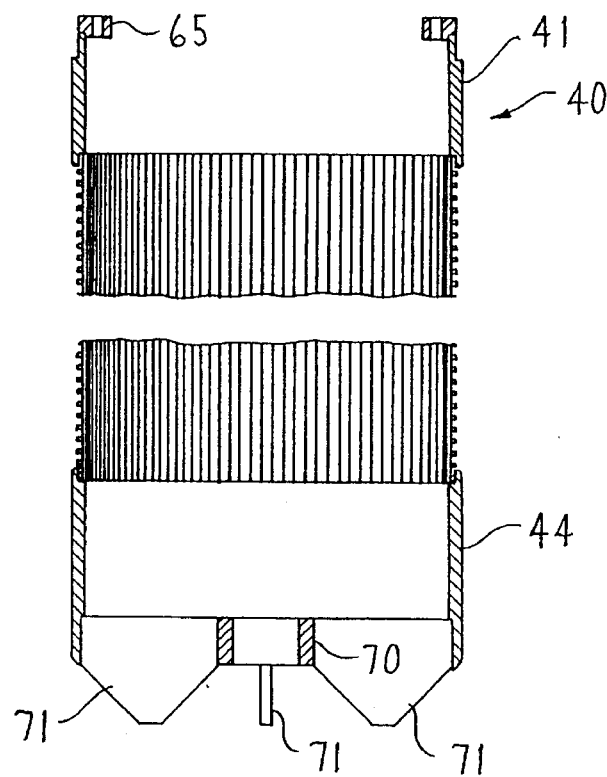
FIG. 6 is a fragmentary central cross-sectional view of the FIG. 1 filter element.
Figure 7:
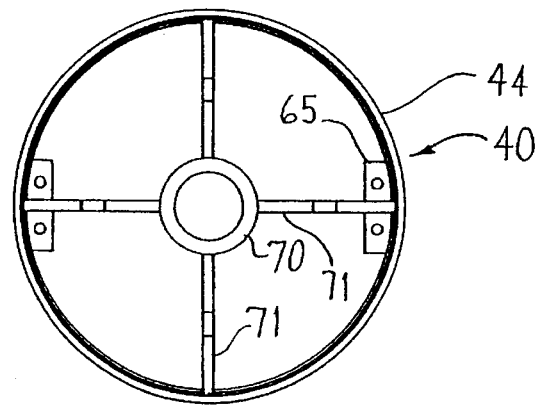
FIG. 7 is a bottom view of the FIG. 6 filter element.

A hub 70 (FIGS. 4, 6 and 7) is fixed coaxially within the filter element 40 adjacent to the bottom end of the filter element by four evenly circumferentially spaced spoke plates 71 fixed, as by welding, to the hub 70 and to the lower portion of the bottom collar 44 of the filter element 40. The spoke plates 71 are thin as seen from above or below (FIGS. 8 and 7, respectively) so as not to interfere with downward flow of solids therepast. The spoke plates 71 are of substantial height in the vertical plane so as to support the hub 70 rigidly, with substantial load carrying capability. The spoke plates 71 are in turn rigidly and strongly supported by the lower ring 33, acting through the bottom portion of the bottom collar 44 of the filter element 40.

All parts of the filter element 40 that are joined by welding (the filter sleeve 45, top collar 41, bottom collar 44, ears 65, spoke plates 71 and hub 70) are constructed of the same material, preferably stainless steel, so as to prevent failure of welds at high operating temperatures (e.g., 650° F.) due to different amounts of thermal expansion exhibited by dissimilar materials.

The rotor 62 includes a bottom stub shaft 72 (FIG. 4) snugly but rotatably received in the hub 70 and having a radially enlarged head 73 overlapping the top of the hub 70. The stub shaft 72 is rotatable in the hub 70, which acts as a thrust bearing for axially carrying the weight of the rotor 62 and radially guiding rotation of the bottom end thereof. If desired, a replaceable flanged wear bushing 78 (FIG. 4) fixed by a set screw 79, may be interposed between the hub 70 and stub shaft 72 of the rotor 62. In addition, the bottom of the non-rotatable drive screw 61 is coaxially piloted on the rotatable stub shaft 72. More particularly, the bottom of the fixed drive screw 61 is stepped to provide a reduced diameter central pilot 74 snugly radially received in a coaxial, circular cross section, bearing recess 75 in the top of the stub shaft 72. The bottom portion of the fixed drive screw 61 (including the pilot 74 and the step from which it depends) is spaced above the opposing bottom of the recess 75 and top of stub shaft 72, by a clearance gap sufficient (e.g. ⅛ inch) as to allow for clearance stackups. The stub shaft 72, and hence the hub 70, act to coaxially support the weight of the rotor 62 while the beam 63 acts to pendently support the weight of the cleaning unit 60 acting through its fixed drive screw 61.

Figure 4:
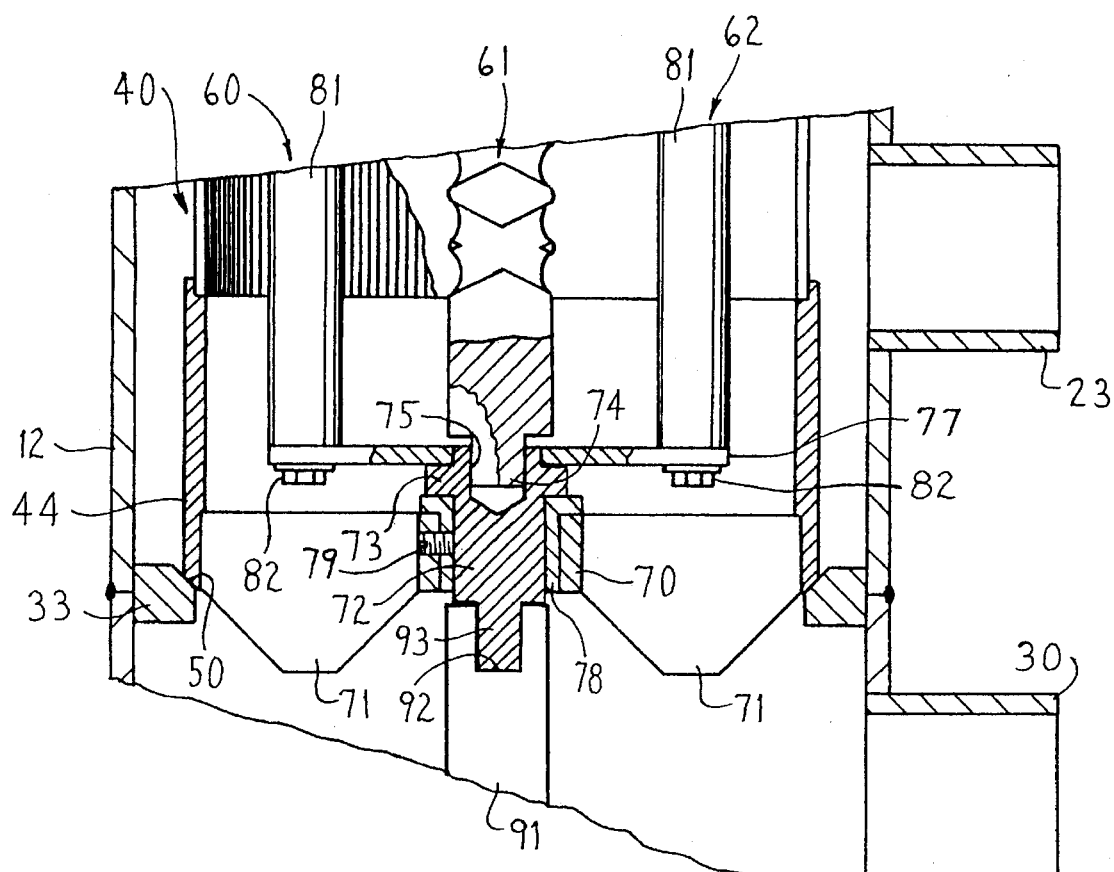
FIG. 4 is an enlarged fragment of FIG. 1 showing the lower part of the rotor.
Figure 5:
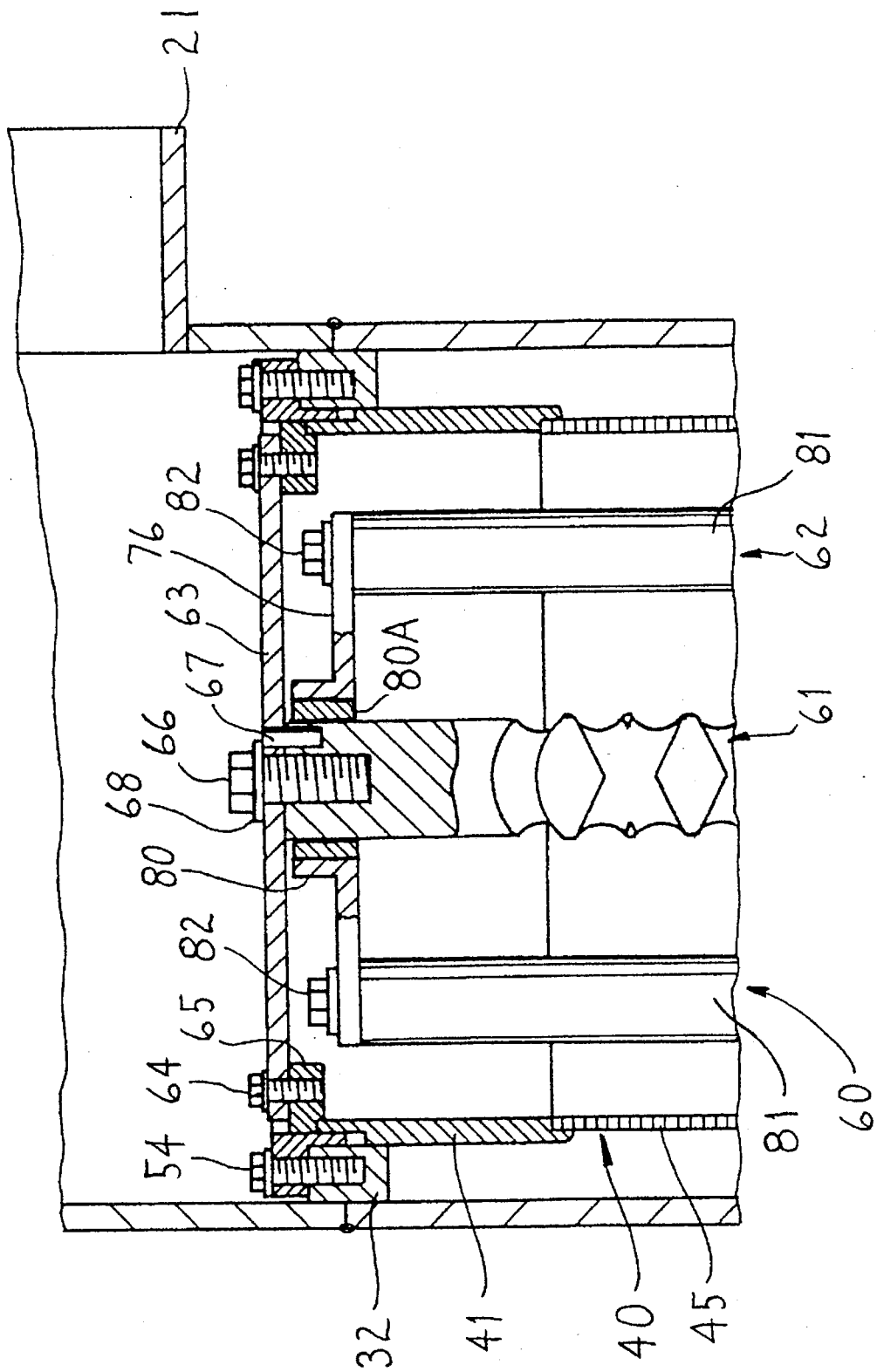
FIG. 5 is an enlarged fragment of FIG. 1 showing in more detail the upper rotor and screw mounting.

The rotor 62 comprises diametrally extending top and bottom wings 76 and 77 (FIGS. 1, 4 and 5). The top wing 76 has a central hub 80 (FIG. 5) which snugly surrounds and rotatably pilots on the upper end of the fixed drive screw 61. The central hub 80 preferably has a replaceable bushing 80A fixed therein, by any conventional means not shown, to rotatably engage the upper end of the drive screw 61. The bottom wing 77 (FIG. 4) is coaxially fixed on the stub shaft 72, and more particularly on a necked down, top portion of the head 73 thereof. The rotor 62 further comprises an upstanding, diametrally spaced pair of drive spindles 81 symmetrically disposed on opposite sides of the fixed drive screw 61, in coplanar relation therewith. The drive spindles 81 (FIGS. 4 and 5) extend between and are fixed with respect to the radially outer ends of the top and bottom wings 76 and 77. Axial screws 82 fix the top and bottom ends of the drive spindles 81 to the radially outer ends of the top and bottom wings 76 and 77. The bottom wing 77 is fixed to the head 73 of the stub shaft 72 by any convenient means such as welding, for rotation therewith.

Accordingly, rotation of the stub shaft 72 rotates the bottom wing 77 and therewith the drive spindles 81 and top wing 76 with respect to both the fixed drive screw 61 and the loosely surrounding filter element 40.

All major parts of the aforedescribed cleaning unit 60, including the drive screw 61, beam 63, rotor 62, wings 76 and 77, and stub shaft 72, and all minor parts of which these major parts are comprised, and all fasteners and weld fillers joining these parts, are constructed of the same type of materials, e.g., all stainless steel or all carbon steel, in order to prevent failure of welds, loosening of fasteners, and seizure of close-fitting rotating and sliding parts at high operating temperatures (e.g., 650° F.), due to different amounts of thermal expansion exhibited by dissimilar materials.

The stub shaft 72 is rotatably driven by any conventional means M (FIG. 3), which may be a constant speed, single direction, electric motor with a speed reduction gear. Preferred rotational speeds are in the rate of about 10–20 rpm. In one unit constructed according to the invention, a speed of 14 rpm was used successfully.

Figure 3:
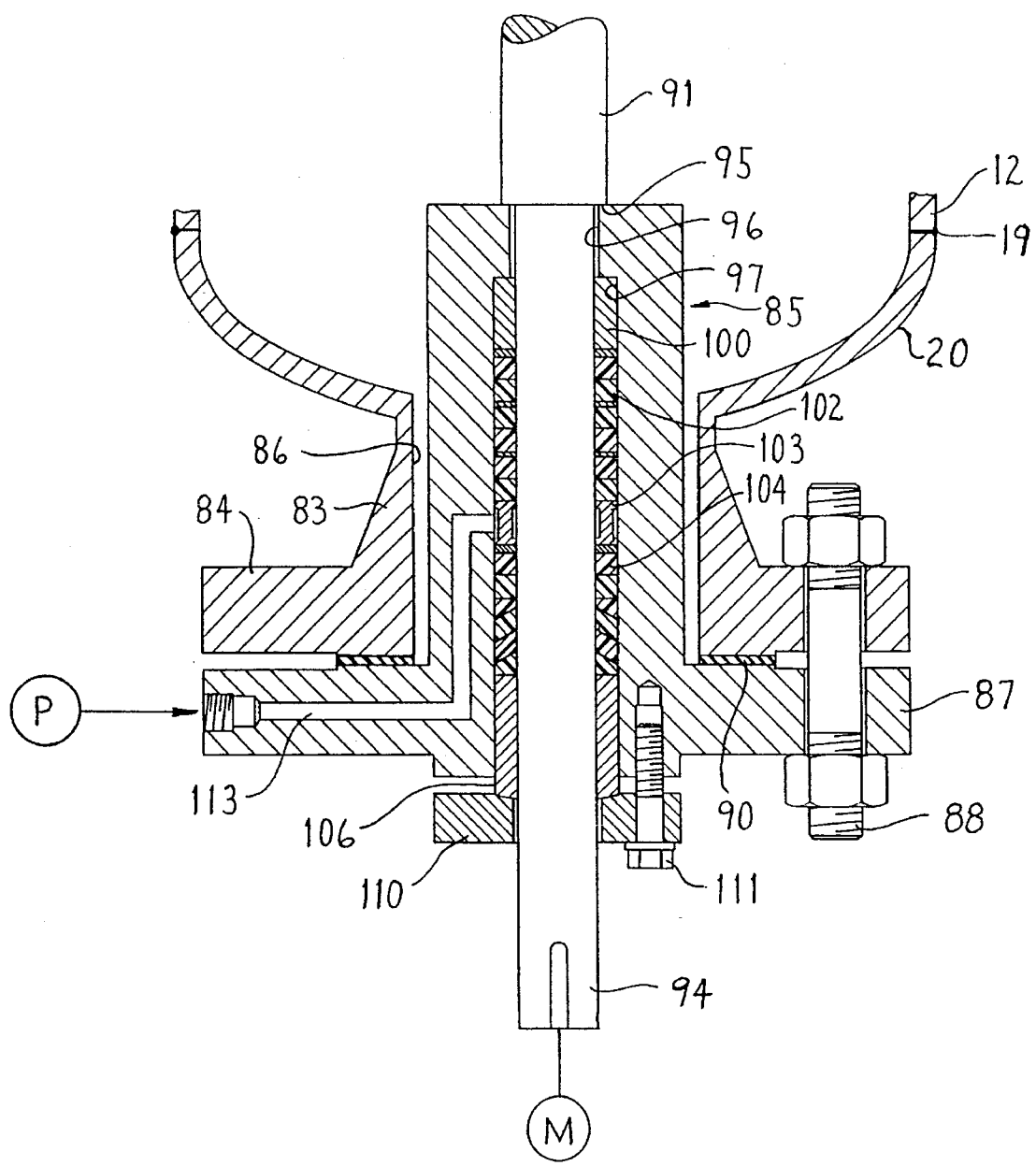
FIG. 3 is an enlarged fragment of FIG. 1 showing in more detail the lower drive shaft seal.

By suitable means, including a reversal of arrangement of parts, the rotor 62 could be driven from above, as for example in abovementioned U.S. Pat. No. 5,198,111. However, the rotor 62 is here rotationally driven from below. Turning more particularly to FIGS. 3 and 4, the bottom cap 20 is here provided with a coaxial downward opening neck 83 terminating at its bottom end in a radially outwardly extending annular flange 84. A generally cylindrical, hollow packing casing 85 extends up through a central opening 86 in the neck 83. A radially outward extending annular flange 87 is coaxially fixed on the bottom end of the packing casing 85, underlies the annular flange 84 of the casing 12, and is coaxially fixed thereto by plurality (for example at least three) of evenly circumferentially spaced, nutted, threaded studs 88. An annular seal 90 prevents liquid leakage between the flanges 84 and 87.

The drive shaft 91 (FIG. 4) has an upfacing diametral groove 92 in its upper end and vertically slidably receiving a corresponding diametral tongue 93 on the bottom of the stub shaft 72 for rotative driving of said stub shaft 72 by the drive shaft 91. The lower portion 94 (FIG. 3) of the drive shaft 91 is reduced in diameter at a shoulder 95 and extends coaxially downward through a central bore 96 in the hollow packing casing 85. The shoulder 95 rides atop the packing casing 85 to prevent the shaft 91 from falling out of engagement with the stub shaft 72 of FIG. 4. The central bore 96, near but below the top of the packing casing 85, is widened to form a downwardly opening annular packing chamber 97 through which the lower portion 94 of the shaft 91 downwardly extends. The annular packing chamber 97, defined radially between the packing casing 95 and shaft lower portion 94, snugly receives therein, starting from the top and working downward, an upper bearing bushing 100, conventional packing material 102, a liquid distribution sleeve 103, further packing material 104, and a lower bearing bushing 106. An annular retainer plate 110 loosely surrounds the lower portion 94 of the shaft 91. Evenly circumferentially spaced screws 111 (for example at least three) pass up through corresponding holes in the annular retainer plate 110 and threadedly engage underside of the packing casing 85 to press the annular retaining plate 110 upward against the lower bearing bushing 106 and thereby compresses the packing 102 and 104, so as to tend to seal the downward shaft extension 94 against leakage from the reservoir 12.

A flow of clean liquid from a suitable pressure source P (FIG. 3) may be applied, through a passage 113 in the packing casing 85, to the liquid distribution sleeve 103 at a pressure slightly higher than the pressure in the bottom of the reservoir 12 such that any leakage along the packing 102 and 104 will be of such clean liquid from the source P inward or outward along the downward shaft extension 94. The contaminated, solids bearing liquid in the bottom of the reservoir 12 thus is positively blocked from escape downward along the shaft extension 94. If desired, the liquid from the pressure source P can be filtered liquid from the filtered liquid outlet 23, in which case the pressure source P can be a pump for delivering and somewhat raising the pressure of a small percentage of the liquid from the outlet 23 to the passage 113.

Figure 14:
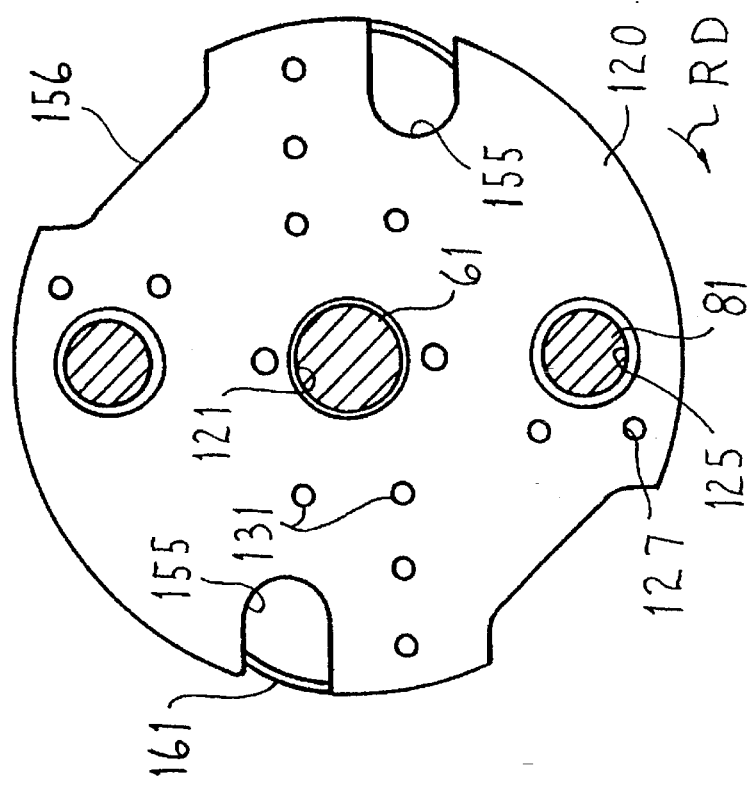
FIG. 14 is a sectional view substantially taken on the line 14—14 of FIG. 11.

The cleaning unit 60 further includes a generally disk-like, circular support 120 (FIGS. 10–12). Coaxially fixed atop the support 120, and registered with a coaxial hole 121 (FIG. 14) through the support 120, is a nut unit 122 (FIGS. 11 and 12) which threadedly receives therethrough the drive screw 61, so as to move the support 120 axially along the screw in response to rotation of the support 120 with respect to the screw 61. In the preferred embodiment shown, the nut unit 122 has three evenly circumferentially spaced internal balls 123 (one of which is shown in FIG. 12) which roll in a low friction manner in the grooves 124 of the drive screw 61. In one unit according to the invention, the cross threaded (bidirectional) screw 61 and nut unit 122 were purchased as a single assembly from Flennor/Norco located at Hartford, Conn. under Series No. MM 1800.

The support disk 120 further includes means for engaging the drive spindles 81 of the rotor 62. In the embodiment shown, such means include diametrally spaced holes 125 in the support disk 120 which loosely receive the drive spindles 81 therethrough. Wear bars 126 extend chordally across the rotatably leading edge of the holes 125, such that the rotating drive spindles 81 push against the wear bars 126 and not the leading edges of the holes 125 and the support disk 120. Thus, any tendency of the drive spindles 81 to wear on the support disk 120 is imparted to the replaceable wear bars 126 rather than the support disk 120 itself.

The cleaning unit 60 further includes diametrically opposed and aligned hollow guide members 130 (FIGS. 9 and 12) fixed atop the support disk 120 by screws 131. In the preferred embodiment shown, the hollow guide members 130 are conveniently substantially rectangular blocks having coaxial bores 132. Blade carriers 133, here substantially of circular cylindrical form, are snugly slidable in the bores 132. Coil compression springs 134 (FIG. 12) are disposed in the bores 132 radially inboard of the blade carriers 133. The radially inner ends of the hollow guide members 130 are located close adjacent the nut units 122. The outer periphery of the nut unit 122 conveniently backs the radially inner ends of the coil springs 134. The radially outer ends of the coil springs 134 push radially outward on the blade carriers 133.

Each blade carrier 133 includes a radially outwardly opening threaded hole 141 (FIGS. 11 and 15) well spaced from both ends of the blade carrier 130. The screw 135 (FIGS. 10–12) threads radially into the hole 141 (FIG. 15) in the top of each blade carrier 133. The upper portion of each screw 135 extends radially upward (FIGS. 10–12) from its blade carrier 133, through a generally L-shaped slot 136 in the top of its guide member 130. The slot 136 extends inboard lengthwise of the guide member 130 and at its inboard end right angles into a transverse foot 139. The L-shaped slot 136 is well spaced from the ends of the guide member 130.

The radially outer end of each blade carrier 133 (rightward end in FIG. 15) has a diametrical slot 142 opening through one end thereof (the radially outer end in FIG. 11 and rightward end in FIG. 15) and ending in a diametrical through hole 143. The slot 142 receives a flat, plate-like cleaning blade 144 (FIGS. 15 and 17). The cleaning blade 144 here is of trapezoidal, indeed almost rectangular, profile (FIG. 17) having a flat inner edge 145, slightly divergent side edges 146 and a slightly convexly curved radially outer edge 147. The blade is preferably constructed of steel in order to allow use at high operating temperatures (e.g., 650° F.). Alternatively, the blade can be constructed of other metals, or of various plastic materials. A dowel pin 150 (FIG. 16) fits into a corresponding diametral hole 151 in each blade carrier 133. The hole 151 extends radially into the blade carrier 133 and perpendicularly crosses the slot 142 to pass through a retainer hole 152 (FIGS. 15 and 17) in the blade 144, to retain the blade 144 against accidental removal from the blade carrier 133. When the blade carrier 133 is assembled in the bore 132 of the guide member 130 and retained by screw 135, the hole 151 is at least partially inside bore 132, thereby preventing the accidental removal of the dowell pin 150.

For easily inserting and removing the cleaning unit 60 with respect to the interior of the filter element 40, one pushes each screw 135 fully radially inboard with respect to the support disk 120, to the inboard end of the longitudinal leg of the L-shaped slot 136, and then pushes the screw 135 transversely into the foot 137 (FIG. 10) of the L-shaped slot 136, namely in a direction widthwise of the guide 130 and circumferentially of the support disk 120. This locks the blade carrier 133 in its stable retracted position (not shown), compressing the spring 134 and holding the blade carrier 133 and its blade 144 spaced radially inboard from the interior surface of the filter element and so allows the cleaning unit 60 to be inserted to or removed from the filter element 40 with a loose radial clearance therebetween. Once the cleaning unit 60 is installed within the filter element 40, each screw 135 is moved out of the foot 137 of its L-shaped slot 136, whereupon the corresponding spring 134 pushes its blade carrier 133 radially outwardly in its guide 130 to abut its blade 144 snugly against the interior surface of the filter element 40. Thus, locking movement of the screw 135 is in the direction of the arrow L of FIG. 10, unlocking movement of such screw being in the opposite direction. The circular cross section of the blade carrier 133, and the corresponding bore 132 in which it is snugly but movably located, allows the carrier 133 to rotate as the screw 135 moves laterally into and out of the foot 137 of the slot 136.

In the preferred embodiment shown, each cleaning blade 144 is angled at an angle A (FIGS. 9 and 16) to a diametral plane of the screw 135 and drive spindles 81. Thus, the blade 144 is at the same angle A to the vertical ribs 46 which it wipes during rotation of the cleaning unit 60 within the filter element 40. It is contemplated that the angle A range from 20° to 40°, but in one unit constructed according to the invention an angle A of 30° worked well. The blade outer wiping edge 147 is convexly curved to line contact filter element's concave interior surface. As seen from above in FIGS. 10, 10A and 15, with the blade at angle A=30° angle to the vertical, the radius R of the blade wiping edge 147 appears to be the same as that of the interior surface of the filter element, for example, 4 inches in one unit constructed according to the invention.

The purpose of angle A is to allow the blade's wiping edge 147 to bridge a number of the filter element's vertical ribs 46, thereby providing smoother operation. If the wiping edge 147 was parallel to the ribs 146 (angle A=O), the edge 147 would abruptly enter and exit the gap PS (FIG. 10A) between each successive pair of ribs 46 as the edge 147 rotated inside the filter element 40. This rapid and abrupt action would accelerate the wear of both blade edge 147 and filter element rib 46. Angling the edge 147 as described prevents the edge 147 from aligning with and entering the gap PS between successive pairs of ribs 46.

The radiusing of the wiping edge 147 can be carried out in any desired way. For example, one can angle the blade at 30° to the vertical and rotating on the same points radius passed a flat vertical grinding surface GS (FIG. 15) tangential to the circular path of the wiping face 147 of the blade 144 as it rotates on the radius R (4 inch radius in the example given herein). As a result, the convex wiping edge of 147, as seen in plan in FIG. 17, will appear flatter (less-curved) than as seen from above the support disk 120, in FIGS. 10 and 15 wherein it follows the radius of curvature of the filter element 40. On the other hand, the convex wiping edge 147 will appear absolutely straight as seen from the side in FIG. 11 wherein it follows the vertical elevation of the filter element 40.

The spacing DB (FIG. 17) of the blade hole 152 from the blade inner edge 145 is substantially less than the spacing DS (FIG. 15) of the bottom of the diametral through hole 143 from the threaded hole 151, so as to allow the blade 146 to pivot slightly around the dowell pin 150, namely around the axis of the holes 151 and 152, in the plane of the slot 142 in the carrier 133. This enables the blade 144 to follow to minor surface variations in the interior surface of the filter element 40, as it moves circumferentially and vertically during cleaning movement of the cleaning unit 60.

The outer ends of the blade carriers 133 taper away from the opposite sides of the blade slot 142 and blade 144, as seen at 153 (FIG. 15). As seen in FIG. 10, such tapers 153 allow a widening clearance between the end of the blade carrier 133 and the interior wall of the filter element 40 for easy flushing away of solids removed by the blade 144 from the interior surface of the filter element 40. This avoids any tendency for solids to clog in the space between the end of the blade carrier 133 and interior face of the filter element 40.

The outer leading corner of each guide member 130 is preferably rounded off as indicated at 154 in FIG. 10, to provide clearance from the interior wall of the filter element 40, thereby again to help in flushing away of solids dislodged by the blades 144. The rounded corner 154 faces in the direction of rotation, as indicated by the arrow RD in FIGS. 1 and 10.

Relatively deep notches 155 (FIGS. 10, 13 and 15) are provided in the peripheral edge of the support disk 120 beneath the rotationally leading side of the guide member 30 for receiving therethrough the downward composite flow of liquid to be filtered and entrained solids dislodged from the interior face of the filter element 40. Additional flow of unfiltered liquid downward past the support disk 120 is permitted by diametrally opposed shallow recesses 156 in the radially outer edge of support disk 120 at locations circumferentially spaced from the notches 155.

Deflector shells 161 are fixed to the bottom of the support disk 120, by any convenient means, such as welding. The deflector shells 161 have a downwardly convexly rounded shape characterized by a convexly rounded leading side 162, a flat and substantially vertical trailing side 163 and an open side 164 which faces toward the center of the support disk 120. Each deflector shell 161 may conveniently be formed, for example, by cutting it from a conventional, convexly rounded, steel pipe cap, in the manner of a cut pie slice.

Figure 13:
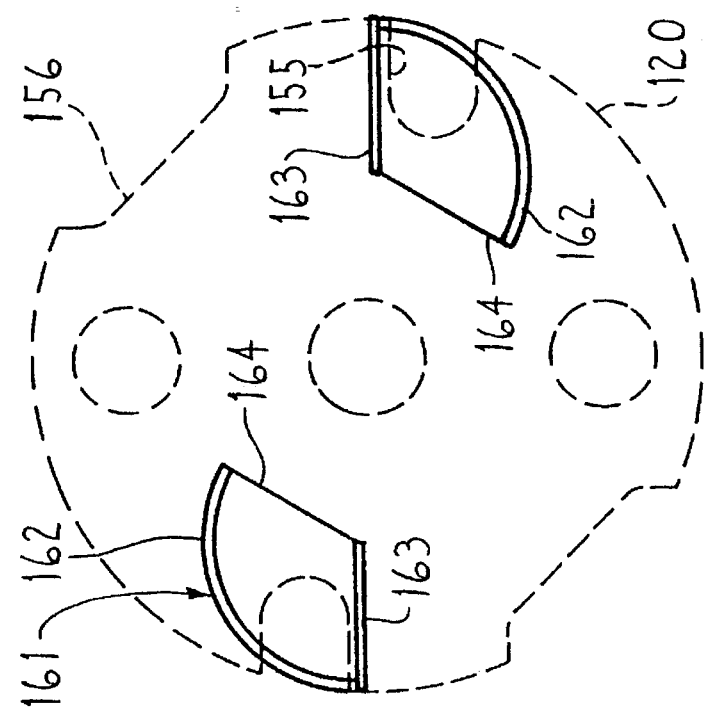
FIG. 13 is a sectional view substantially taken on the line 13—13 of FIG. 11.

In one unit constructed according to the invention, wherein the internal diameter of the filter element was about 8 inches, the diameter of the pipe cap was about 3½ inches (for example, such pipe cap being a 3 inch Sch 40 steel pipe cap). The flat vertical trailing side 163 of the deflector shell 161 was simply a piece of steel plate welded to the pipe cap slice 162, both being welded to the support disk 120. As seen in FIG. 13, the deflector shell 161 is open at the top to the corresponding notch 155 in the support disk 120 for receiving liquid and dislodged solids. Thus, during rotation, the deflector shells 161 tend to keep dislodged solids away from the interior wall of and toward the axis of the filter element, thereby impeding reattachment of such solids thereto as they are moved toward the far end (bottom in the drawings) of the filter element.

In the embodiment shown, the inside of the upper edge of each deflection shell 161 is chamfered as at 165 in FIG. 12, to facilitate entry of liquids and entrained solids downward through the notch 155 into the corresponding deflection shell 161.

OPERATION

While the operation of the disclosed embodiment of the invention has been detailed above, same is briefly indicated below for convenient reference.

During assembly, the packing casing and drive shaft 91 are preassembled, connected to the pressure source P (if desired), and fixed with the seal 90 and nutted studs 88 to close the bottom of the filter casing 12. The filter element 40 is lowered into the housing 11 until its bottom collar 44 rests upon the lower ring 33 of the housing 11. The clamp ring 53 is fixed by the screws 54 to the upper ring 32 (FIG. 2A) of the housing 11 and acts through the packing 43 to hold down the top collar 41 and thereby firmly seat the bottom collar 44 of the filter element on the bottom ring 33 of the housing. The preassembled cleaning unit 60 is lowered into the open top of the housing 12 and the stub shaft 72 pilots into the hub 74 for rotation with respect thereto and the underlying diametral tongue 93 enters the diametrical groove 92 in the top of the drive shaft 91 for rotational driving thereby. With the cleaning unit 60 thus being supported at its lower end by the hub 70, the horizontal beam 63 fixed at 66, 67 (FIG. 5) to the top of the fixed screw 61, has its ends fixed by the screws 64 to the ears 65 of the filter element top collar 41.

Before insertion of the cleaning unit 60 into the filter element, the user retracts the blades 144, by shifting each screw 135 in toward the center of the support disk 120 and then circumferentially of the support disk 120 into the foot 137 of the corresponding L-shaped groove 136. This keeps the blades 144 retracted to allow loose travel of the cleaning unit 60 down into the filter element 40. Once the cleaning unit 60 is fully installed in the filter element, each locked screw 135 can be shifted out of the foot 137 of the corresponding L-shaped groove 136 so that the corresponding spring 134 pushes the blade 144 firmly against the interior wall of the filter element for cleaning.

With the filter element 40 and cleaning unit 60 thus in place, the top of the housing 11 is closed by the cover 16 (FIG. 2) fixed in place by the nutted studs 13.

With liquid to be filtered entering the top of the housing 11 through the inlet 21, and flowing through the interior of the filter element 40, the filter sleeve 45 allows radially outward passage therethrough of filtered liquid to the outlet 23 and retains therein filtered out solids on its inside surface.

Rotation of the drive shaft 91 by the motor unit M rotates the drive spindles 81 and support disk 120, and thus the nut unit 122 on the fixed drive screw 61. The nut unit and drive screw are of the commercially available type which causes the nut unit to thread along one set of threads in one axial direction to one end of the drive screw and then reverse axial direction and proceed along the cross angled threads toward the other end of the screw. Upon reaching the other end of the screw, the nut unit reverses and resumes its one direction of travel threading along the one set of threads. Thus, continued rotation of the motor unit M, drive spindles 81, support disk 120 and nut unit 122 in one direction results in reciprocation of the nut unit 122 and support disk 120 repetitively up and down between the ends of the drive screw in a continuous repeating manner. Assuming a rotational rate of 14 rpm and a 1.25 inch drive screw lead (i.e., one rotation of the nut unit moves it 1.25 inch along the screw), the rate of travel of the nut unit and support disk along the drive screw would be approximately 0.3 inch per second.

As the support disk 120 and nut unit 122 rotate and simultaneously move length-wise along the screw, each blade 144 travels in a conical helical path along the interior of the filter element 40. The two blades 144, which are diametrally spaced from each other on the support disk 120, follow overlapping helical cleaning paths on the filter element 40 so that the entire interior surface of the filter element is cleaned during each reciprocation of the nut unit 122 along the drive screw 61.

The solids thus removed from the interior of the filter element are flushed off each blade 144, through the notch 155 in the support disk 120 and radially inward below the support disk 120 by the corresponding deflector shell 161, so that solids can flow along the drive screw 61 and into the bottom 20 of the housing 11 for later removal. The continuing flow of liquid from inlet 21 to outlet 23 assures the continuing downward wash of liquid within the filter element, past the blades 144, through the notches 155 and deflector shells 161, regardless of the direction the support disk 120 is moving along the fixed drive screw 61.

Further because the blades are relatively small, are angled with respect to the axis of the filter element, and are pushed outward by the springs 134, the blades 144 make continuously cleaning contact with the interior wall of the filter element despite deviations of the filter element wall from a true cylinder coaxial with the drive screw 61. Further, the continued operation of the cleaning unit 60 maintains the filter element in the clean condition for high efficiency continued filtering.

While the character of the perforations in the filter element may vary, the outwardly tapered pores indicated at 148 in FIG. 10A have been found to work well in that solids particles small enough, to be worked into a given pore by the blade 144, are easily blown out of the that pore via the flow of filtered liquid outwardly therethrough.

In one unit constructed according to the invention, the effective porosity of the filter element 40 was about 0.001 inch (about 25 micro meters or microns), as measured at PS in FIG. 10A, namely between the narrow inner ends of generally V-shaped grooves 48 spacing the vertical ribs 46. The divergency of the walls of each groove 48 away from the interior of the filter element 40 has been found to substantially reduce the likelihood of plugging such grooves 48 with solids as the cleaning unit blade scraps along the interior face of the filter element 40. Reduced clogging appears to result because the divergence of the pores, or V-shaped grooves 48 allows any particle entering the narrow end of the groove 48 to be flushed away, radially outwardly of the filter element 40.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A self-cleaning pressure filter system comprising:

a housing having an unfiltered liquid inlet and a filtered liquid outlet;

a filter element of generally cylindrical shape with open ends and defining an axis and an interior face, said filter element having an interior communicating with said unfiltered liquid inlet and an exterior communicating with said filtered liquid outlet and configured to filter solids from the liquid and wherein filtered out solids are left in the interior of said filter element;

a screw extending coaxially through said filter element and fixed with respect to said filter element;

a rotor coaxially rotatable with respect to said screw and filter element;

a cleaning unit disposed in said filter element interior for cleaning of filtered out solids from said interior face of said filter element, said cleaning unit having an axis coaxial with said filter element axis, said cleaning unit including an axially mounted nut means threadedly coupled to said screw to facilitate reciprocal movement of said cleaning unit through said filter element;

motor means fixed with respect to said housing for rotating said rotor;

means on said cleaning unit coupling said cleaning unit to said rotor for rotating said cleaning unit with said rotor so as to threadedly axially advance said cleaning unit along said screw; and means for reversing axial movement of said cleaning unit along said screw after said cleaning unit reaches a preselected location on said screw.

2. The apparatus of claim 1 in which said means for reversing axial movement of said cleaning unit comprises cross-threading on said screw and follower means on said nut means for following said cross threading so as to reverse axial movement of said cleaning unit.

3. The apparatus of claim 1 in which said rotor comprises at least one rod extending substantially parallel to said screw and located eccentrically thereof and means coaxial with said screw for rotatively supporting said rod for rotation about said screw, said cleaning unit having means located eccentrically thereon for axially slidable engagement with the rod and therewith for rotation of said rotor upon rotation of said rod so as to thread said rotor axially along the said screw.

4. The apparatus of claim 1 in which said cleaning unit includes at least one cleaning blade angled axially and circumferentially thereon and in cleaning engagement with said interior of said filter element for shaving deposited solids from said interior face of said filter element.

5. The apparatus of claim 4 wherein said cleaning unit has an outer radius less than a radius defined by said filter element interior face and said cleaning blade is relatively short, in its extent along said interior face of said filter element, as compared to the radius of the cleaning unit.

6. The apparatus of claim 4 including means detachably connecting said cleaning blade to the remainder of said cleaning unit for facilitating changing of said blades.

7. The apparatus of claim 4 in which said cleaning unit comprises a support, a blade carrier for holding said cleaning blade, means on said support for guiding said blade carrier substantially radially of said support, resilient means for urging said blade carrier generally radially outwardly with respect to said support and for urging said cleaning blade resiliently against said interior face of said filter element for cleaning same.

8. A self-cleaning pressure filter system comprising:

a housing having an unfiltered liquid inlet and a filtered liquid outlet;

a filter element of of generally cylindrical shape with open ends and an interior face and defining a center axis, said filter element having an interior defined by said interior face communicating with said unfiltered liquid inlet and an exterior communicating with said filtered liquid outlet and configured to filter solids from the liquid and wherein filtered out solids are left in the interior of said filter element;

a cleaning assembly for cleaning said filter element, said cleaning assembly including: a support member mounted in said filter element interior; at least one blade carrier mounted to said support member; a cleaning blade fitted in said blade carrier and positioned to be oriented directly outwardly relative to said support member; a biasing member positioned against said blade carrier for urging said blade carrier outwardly so that said cleaning blade is urged against said filter element interior wall; and drive means for axially moving said support member through said filter element while simultaneously rotating said support member so that said cleaning blade travels along a helical path around said interior face of said filter member, wherein said support member includes an eccentrically located hole relative to the filter element axis and said drive means for rotating and axially moving said support member includes a rotating member extending axially through said eccentric hole and rotatable within said filter element for rotating said support member.

9. The apparatus of claim 8 wherein said filter element interior face has a diameter and said cleaning blade is relatively short in its extent along the interior face of the filter element as compared to the diameter of said filter element interior wall.

10. The apparatus of claim 8 in which the total extent of said cleaning blade in contact with said filter element, measured axially of said filter element, exceeds the axial advancement of said support per rotation of said support, so that the portion of the interior face of said filter element cleaned in one rotation of said support will at least slightly overlap the portion cleaned in the proceeding rotation of said support.

11. The apparatus of claim 8 including a second said cleaning blade attached to a second said blade carrier fitted to said support member, and a second biasing member that abuts said second blade carrier for urging said second blade outwardly against said filter element interior wall, said second cleaning blade being spaced diametrically across said support member from said first cleaning blade so that the radial back pressure applied to the support by the first mentioned blade will be substantially counter-balanced by that of said second blade.

12. The apparatus of claim 8 in which said support member comprises a plate-like member having a notch in the periphery thereof, said blade carrier and said blade being located atop said plate-like support member, the cross-section of said blade being tilted with respect to the axis of said filter element, so that the bottom of said blade cross-section is angled towards said notch.

13. The apparatus of claim 12 including a scoop-like member fixed under said plate-like support member and closed radially outward, downward, and at its circumferentially leading and trailing faces, said scoop-like member having an opening located substantially radially inwardly such that solids stripped from the interior face of said filter element by the corresponding said blade will tend to pass down through the adjacent notch in said plate-like support, fall into the scoop-like member and be ejected radially inward toward the axis of said filter element.

14. The apparatus of claim 13 in which further notches in the edge of said plate-like support permit flow of liquid to be filtered downward past said plate-like support member.

15. The apparatus of claim 8 including a wear pad fixed on said support member at the leading edge of said hole for increasing the contact area of said support member with said rotating means to avoid the latter wearing said hole over an extended period of use.

16. The apparatus of claim 8 in which said blade carrier comprises an elongate, substantially cylindrical member carrying said blade in a slot at the radially outboard end thereof, means for guiding said blade carrier having a hollow guide member fixed on said support member, an L-shaped slot in said guide member for receiving a radially extending pin-like member extending radially from said carrier for (1) allowing said carrier to move radially outward into contact with said filter element in response to urging of said biasing member and (2) also allowing said carrier to be moved substantially radially inward away from the interior face of said filter element, for latching said carrier and blade said pin-like member on the periphery of said carrier being movable into circumferentially extending leg of said L-shaped slot to retain said carrier and blade in a position spaced radially inboard and away from the interior face of the filter element, to allow the cleaning unit to be easily pulled axially out of the interior of the filter element upon disassembly of the apparatus.

17. The apparatus of claim 8 in which said filter element is formed with a plurality of holes communicating between the interior and exterior of said filter element, said holes being narrower at their radially inboard ends than at their radially outboard ends.

18. The apparatus of claim 1 in which said rotor has a downward extending shaft coaxial with said filter element, means axially supporting said shaft and hence said rotor with respect to said filter housing, said rotor shaft having an extension extending coaxially downward through the bottom of said filter housing, said motor means is located below said filter housing for rotatably driving said shaft extension, said shaft extension passes downward to the bottom of said housing through a surrounding packing casing sealed with respect to said housing, said housing having an outlet for filtered out solids near the bottom thereof, packing material radially interposed between said shaft extension and the surrounding packing casing, means for applying a clean liquid similar to the filtered liquid to an axially intermediate portion of said packing at a pressure somewhat higher than the liquid pressure in the bottom portion of said housing, so that any tendency of said packing to leak will not result in leakage of solids-contaminated liquid in the bottom of said filter housing downward along said shaft extension.

* * * * *